United States Patent Office 2,849,280
Patented Aug. 26, 1958

2,849,280
NITRIC ACID TREATMENT OF LEACHED ZONE MATERIAL

Ira M. Le Baron, Evanston, Ill., and Robert F. McCullough, Lakeland, Fla., assignors, by mesne assignments, to the United States of America as represented by the United States Atomic Energy Commission No Drawing. Application August 17, 1953
Serial No. 374,810
14 Claims. (Cl. 23—14.5)

The process of the instant invention relates to the recovery of certain mineral values found in the so-called leached zone of the overburden found in the Florida pebble phosphate sands. More particularly, it relates to the solubilizing of the mineral values so that they may be separately recovered. Still more particularly, it relates to a process for the recovery of uranium, phosphorus and aluminum values.

Strip mining removes the top cover from the phosphate beds, the first uncovered layer of which is the leached zone or so-called Bartow clay. This leached zone contains acid soluble and insoluble silicon materials, as well as uranium, phosphorus, aluminum, calcium, iron and minor values.

Recovery of the uranium from the leached zone material has been effected in the past by solubilizing the mineral constituents by means of a mineral acid such as sulfuric acid, removing the uranium from solution and treating the resultant solution to produce a chemical fertilizer or plant food product.

It is the object of this invention to provide a process whereby not only uranium, but also aluminum and phosphorus values are recovered.

It is still another object of this invention to provide a process which is highly efficient in the extraction and recovery of each of the uranium and phosphorus values.

It is still another object of this invention to provide a process wherein volatile constituents of the solubilizing agent are scrubbed out of waste gas and recovered for re-use in the process, thus lowering the cost of reactants. These and other advantages will be apparent from the following description.

In the process of the present invention, the leached zone material may be subjected to the novel acid solubilizing process directly as mined, with or without drying and calcining. However, the preferable procedure is to size the ore, comminuting when necessary, to recover a small particle size fraction of a particle size normally smaller than about 150 mesh by such means as hydraulic classification. The small particle size material is the more valuable portion of the leached zone material for the purpose of the instant invention, because it contains roughly 70 percent or better of the valuable minerals. Alternatively, mineral values may be solubilized from the ore as mined and the coarse material removed during the course of the leaching operation.

Leached zone material varies considerably in composition depending upon the area in which it is mined. Therefore, the following description is given with reference to a leached zone material having the following representative assay:

| Mineral value | Plus 200 mesh | Minus 200 mesh |
|---|---|---|
| $P_2O_5$ | 5.44 | 14.68 |
| $Al_2O_3$ | 1.68 | 25.34 |
| CaO | 5.53 | 9.19 |
| $Fe_2O_3$ | 1.60 | 3.11 |
| $U_3O_8$ | 0.0053 | 0.03 |
| Acid insoluble | 83.08 | 38.56 |
| Percent of total weight | 67 | 33 |

The process as applied to this representative material will be described with reference to optimum conditions for recovery of minerals from the leached zone material and it will, of course, be understood that the optimum conditions will vary somewhat with variation in feed composition.

In general the process comprises reacting the leached zone material with nitric acid, mixing the reacted mixture with an aqueous medium, and separating the insoluble materials from the aqueous solution of reaction products. This aqueous medium may then be treated to recover the mineral values.

Solids from a hydraulic classification and ore dressing operation, thickened to between about 20% and about 65% solids density, are reacted or digested with an acid such as nitric acid under such conditions of time, temperature, pressure, concentration of acid, and total amount of acid per unit of solid material so as to obtain optimum solubilizing of uranium, phosphorus and aluminum, i. e., through the formation of reaction products soluble in aqueous media. The reaction conditions may be such as to give either a slurry product or a product substantially dry as in superphosphate.

Slurry products may be formed as a result of the so-called wet process method or the pressure method. In the wet process method, reaction is carried out at a temperature generally between about 30° C. and about 90° C. and preferably at about 75° C. Digestion of the slurry from the ore dressing operation is carried out in a soupy condition for a period of about 30 to about 360 minutes. The operation is carried out under conditions for maximum solubilization of mineral values preferably during a reaction period of about 15 minutes to about 24 hours.

Time of reaction is generally shorter in the pressure or autoclave treatment method. Slurry to be treated by this method may vary from about 20° to about 65% solids content of —150 mesh particle size material. Digestion of this slurry requires between about 1 minute and about 60 minutes, preferably about 30 minutes to about 45 minutes. Temperatures maintained in the reacting mass range from about 60° C. to about 200° C. or higher. Pressures maintained on the digesting mass may be extraneously produced or autogenous pressure. Pressures ranging between about 10 pounds and about 175 pounds per square inch or above are usable, but it is preferred to maintain pressures of about 160 pounds per square inch.

In all of the digestion operations there is an interrelationship of reaction conditions. In general, for example, the shortening of the reaction time may be accomplished by increasing the degree of acidulation. The degree or percent of acidulation referred to in this description is calculated on the basis of the reaction of nitric acid with all of the iron, aluminum, calcium, magnesium and sodium, or other significant cationic constituents present to form soluble nitrates.

Further, increased solubilization of uranium, phosphorus and aluminum in solution may be obtained with corresponding increase in percent acidulation. In addition, in such systems as the autoclave methods at any percent acidulation below about 100 percent, increasing the reaction pressure above atmospheric pressure likewise increases recovery of uranium, phosphorus, and aluminum in solution up to a maximum after which the recovery may fall off for one or more, if not all, of the constituents. Increasing of both pressure and percent acidulation gives a more favorable recovery for uranium, phosphorus and aluminum, and in commercial operation balancing of effects for optimum operating conditions is required.

In the wet process system concentration of acid in the slurry mixture should be between about 20% and about 70%. Preferably this acid may be added in a concentration such that the final acidulation is in the desired amount. The acid is generally added as 35% to 70% nitric acid.

In the autoclave system the per cent acidulation ranges between about 20% and about 100%, with about 80% acidulation preferred. An 80% acidulation is created by the addition to the slurry of 35% nitric acid and at 80 pounds per square inch gauge pressure the digestion time is approximately one hour, although the time is relatively unimportant since uranium recovery for example increases only from 97% to about 99% by lengthening the reaction time from ½ hour to 4 hours. This digestion reaction solubilized approximately 97% of the uranium values, approximately 91% of the phosphorus values, and approximately 80% to 85% of the aluminum values. In the autoclave system for a one hour digestion period, as the per cent acidulation is increased from 30% to 120% the recovery of uranium increases with pressure up to about 80 pounds per square inch, after which the recovery falls off appreciably and progressively.

Phosphates while acting in a general way similar to uranium show a rapid increase in per cent recovery with increase of pressure up to a maximum recovery at about 40 pounds per square inch, which recovery at the higher per cent acidulation is maintained relatively constant up to about 80 pounds per square inch pressure following which the percentage recovery falls off.

Aluminum, on the other hand, while having solubility characteristics similar to uranium at per cent acidulations below 50%, shows a steady increase in recovery with increase in pressure between about 40 pounds per square inch and about 160 pounds per square inch pressure at acidulations between about 75% and about 120%, the recovery increasing approximately 1% per each 15 pounds increase in pressure above 40 pounds per square inch.

When utilizing the aging method, the mixture of ore and acid is balanced to produce a fluid mass for intimate contact of acid and ore capable of pile storage upon completion of a thorough agitation period. The mixing or agitating time is usually between about two to about five minutes. The mixture resulting from the acid addition is delivered to a curing pile where it sets to a dry mass during the time it remains in the pile, i. e., about 1 hour to about 60 days, preferably about 30 days although the exact time is not critical. In general the longer the curing period the higher the ultimate recovery of the desired constituents will be.

The concentration of acid employed in the aging process is usually the highest possible concentration compatible with the type of equipment used and with the ability to mechanically agitate the fluid mass during the acid addition step. The nitric acid is usually added as 30% to 60% nitric acid. The greater the per cent of the acidulation, the greater the ultimate recovery of desired constituents will be. Acidulation will vary from about 25% to about 85%, and preferably will be about 50%.

Digested material from any one of the above described treatment methods is mixed with water or an aqueous medium to form a slurry of insoluble material and solution of soluble constituents. The solution or extract after removal of the insoluble constituents will vary depending upon the degree of acidulation and feed material used. The composition of this extract solution may vary from substantially phosphoric acid containing an appreciable quantity of nitric acid to a solution which is predominantly monocalcium phosphate. The taking up in the aqueous medium of the soluble constituents is generally done in a stepwise multi-stage countercurrent leaching operation with the solid cake being repulped after each liquid-solids separation.

To recover the uranium from the extract ore solution, the aqueous extract solution is intimately contacted or agitated with an organic solvent having an affinity for uranium values. Temperatures of the solution and organic solvent at the time of contact should not exceed about 55° C. and extraction is preferably carried out at temperatures between about 15° C. and about 30° C.

The organic solvent is generally made up of a minimum of two components, the effective extractant agent and a vehicle or extender. The extractant agent may be one or more of the triesters of phosphoric acid such as tributyl phosphate, triamyl phosphate, trihexyl phosphate or other agents having an affinity for uranium under the process conditions. The extender or vehicle may be any one or more of the common organic fluids such as benzene, naphtha, mineral spirits, carbon tetrachloride, trichlorethylene, and the like. Extenders are limited only in that they must be miscible or partially miscible with the extractant agents used and substantially immiscible in the contacted aqueous solution or phase. To minimize organic losses, inasmuch as the organic phase is substantially immiscible in water, the aqueous raffinate before further processing is normally scrubbed with a suitable organic solvent to reduce the extractant or ester content of the raffinate.

The concentration of extractant in the extender or vehicle may vary widely, for example, between about 0.2% and about 100%, preferably between about 5% and about 10%. The volume ratios of extract phase to organic phase also may vary within wide limits, for example, between about 0.1 to 1 and about 40 to 1, preferably between about 5 to 1 and about 3 to 1. Solution temperatures at the time of contact may be as high as about 80° C. but in general it is preferable that the temperatures be maintained at about room temperature, i. e., between about 20° C. and about 30° C. After agitation of the two phases, i. e., aqueous extract and organic solvent, for about one minute or more, the phases are allowed to separate and the extract raffinate withdrawn for further processing to recover other mineral values. Continuous extraction is usually carried out in commercial operations in a multi-stage countercurrent extractor of 3 to 6 stages. Useful equipment for the extraction operation is pulse columns, mixer-settlers, and the like. Contact time in plant operation has not been found to be a critical factor so long as intimate and complete mixing is obtained. Normally the processing time in commercial equipment is about 1 minute to about 15 minutes per stage, and preferably about 5 minutes per extraction stage. In multistage countercurrent extraction utilizing, for example, tributyl phosphate, the organic phase will take up between about 90% and about 95% of the uranium values originally present in the extract.

The rich organic solvent phase recovered from the extract operation is then treated to remove the soluble uranium compound by contact with water. When water and rich solvent are intimately contacted or agitated, about 90% to about 95% of the uranium compounds are taken up in the water phase. Water is generally slightly acidified by addition of acid such as nitric acid. Water and rich solvent are generally maintained in intimate contact for from about 1 minute to about 15 minutes, normally about 5 minutes. Upon standing in a quiescent zone, the water and stripped or lean organic phase separate. The lean organic solvent is then recycled to the extraction system.

The water solution recovered in the solvent stripping operation is next treated to adjust the pH of the solution with an agent such as ammonia or ammonium hydroxide. Upon adjustment of the pH to approximately 7, a product is precipitated to contain between about 60% and about 80% $U_3O_8$. About 3 to about 12 pounds of ammonia (100% basis) are required to precipitate a pound of $U_3O_8$. Alternatively the uranium may be recovered by electrolyzing the water solution recovered from the solvent stripping operation in a cell compartmentalized with ion exchange membranes. This ion exchange method has the advantage in that it permits recovery of the nitrate values which are extracted with the uranium values. These nitrate values which would otherwise be lost constitute about 2% of the nitrate values in the original mineral digest.

Instead of precipitating $U_3O_8$ from the water solution recovered in the solvent stripping operation, the water solution may be reextracted with trialkyl phosphate esters to form a secondary rich solvent phase. This phase is stripped of its uranium values with acidified water and a highly purified product may be precipitated therefrom with ammonium hydroxide, or after reduction hydrofluoric acid and equivalent precipitants may be used.

Aqueous raffinate from the extract operation may be evaporated to dryness to recover the soluble constituents and the solids calcined at temperatures above about 500° C. and preferably between about 700° C. and about 1000° C. The dry solids consist predominantly of a mixture of aluminum, iron and calcium nitrates and phosphates. The calcination of this mixture of solids drives off a large portion of the nitrates as gaseous oxides of nitrogen which may be recovered for re-use in the digestion circuit. The solids comprising oxides and phosphates can be used as an agricultural source of fertilizer.

Alternatively, the aqueous raffinate may be neutralized with alkaline materials such as ammonia, ammonium hydroxide, lime, magnesium oxide, caustic and the like. If ammonia is used, ammoniation is usually carried to the point where all nitrates are neutralized as ammonium nitrate. In general it is not desirable to attain mole ratios of $NH_3$ to $NO_3$ higher than 1 to 1 because excess ammonia is driven off in the subsequent drying operation. In the neutralization step at pH's of the order of 2.5 to 4, aluminum and iron phosphates precipitate carrying with them a substantial portion if not all of the phosphate content of the solution. Residual $P_2O_5$ if any over and above that required for the aluminum phosphate precipitation necessitates introduction of excess ammonia to produce mono or diammonium phosphates. Neutralization is usually stopped at a pH of about 5 to about 7. If solids are not incrementally removed as the neutralization proceeds, the resulting slurry is dried in conventional drying equipment such as a kiln, rotolouvre dryer and the like at an outlet gas temperature of about 110° C. This slightly hygroscopic product may be used as plant food material.

The invention will be more fully understood from the following example.

Example

Representative leached zone feed assaying 15.2% $P_2O_5$, 23.2% $Al_2O_3$, 2.68% $Fe_2O_3$, 9.1% CaO, and 0.24% $U_3O_8$ as a 34.4% solids slurry in water is mixed with 70% nitric acid at 1.12 pounds dry solids per pound of acid and autoclaved at 80 pounds per square inch at a temperature of above 300° F. for one hour. The resulting mass was cooled and leached countercurrently with water to recover solubilized constituents and the insoluble cake discarded. 1.5 pounds of water per pound of dry leached zone material was used for extraction. An average filtration rate of about 7 pounds of dry solids per hour per square foot was obtained. The resultant filtrate at 1.3 specific gravity assayed 2.95% $P_2O_5$, 4.05% $Al_2O_3$, 0.48% $Fe_2O_3$ and 0.0045% $U_3O_8$. Overall recoveries in the digesting and leaching circuits were 93% $P_2O_5$, 83% $Al_2O_3$, 85% $Fe_2O_3$ and 90% $U_3O_8$.

The resultant filtrate or extract is contacted in a series of mixer settlers with an organic solvent composed of tributyl phosphate and kerosene in the ratio of 1 part of tributyl phosphate to 9 parts of kerosene. The contacted phases were in a volume ratio of 10 parts of extract per 1 part of organic solvent. Intimate contact of the phases was maintained for five minutes in each of the 4 stages of the countercurrent liquid-liquid extraction system. Upon settling, a uranium rich organic solvent phase separated from the aqueous extract raffinate. The rich organic solvent was next contacted with water at a volume ratio of solvent to water of 1 to 1. About 0.0044 pound of uranium was precipitated from the water phase by neutralization with ammonia for about each 100 pounds of extract treated. This precipitate was recovered in the form of a cake assaying about 70% of $U_3O_8$.

The aqueous phase containing $Al_2O_3$, $P_2O_5$, $NO_3$, etc. was evaporated to dryness at 110° C. and heated at 600° C. to produce a product weighing about 10 pounds per each 100 pounds of extract raffinate evaporated. This product assayed 29.5% $P_2O_5$, 40.5% $Al_2O_3$, and 4.8% $Fe_2O_3$.

Having thus fully described and illustrated the character of the invention, what is desired to be secured and claimed by Letters Patent is:

1. A process for recovering the mineral values of leached zone material from the Florida pebble phosphate overburden which comprises reacting the leached zone material with between about 20% and about 60% nitric acid in an amount of between about 30% and about 120% of the amount required to react with all of the constituents of the material capable of reacting with nitric acid and at a temperature between about 60° C. and about 200° C. for between about 0.5 hour and about 6 hours, mixing the reacted mixture with an aqueous medium selected from the group consisting of water and dilute aqueous solutions of the reaction products of leached zone material with nitric acid, separating the insoluble material from the aqueous solution consisting predominantly of aluminum, phosphate, and nitrate components, and recovering from the aqueous solution at least one of the values selected from the group consisting of uranium, phosphorus and aluminum.

2. A process for recovering the mineral values of leached zone material from the Florida pebble phosphate overburden which comprises reacting the leached zone material with nitric acid of a concentration between about 20% and about 70% in an amount of between about 35% and about 70% of the amount required to react with all of the constituents capable of reacting with nitric acid, mixing the reacted mixture with an aqueous medium selected from the group consisting of water and dilute aqueous solutions of the reaction products of leached zone material with nitric acid, separating the insoluble material from the aqueous solution consisting predominantly of aluminum, phosphate, and nitrate components, and recovering from the aqueous solution at least one of the values selected from the group consisting of uranium, phosphorus and aluminum.

3. A process for recovering the mineral values of leached zone material from the Florida pebble phosphate overburden which comprises reacting leached zone material with nitric acid of a concentration between about 20% and about 70% in an amount of between about 20% and about 80% of the amount required to react with all of the constituents of the material capable of reacting with nitric acid while maintaining a temperature between about 60° C. and about 120° C. and a superatmospheric pressure of between about 10 lbs. and about 175 lbs. per square inch gauge, separating insoluble material from the reaction products soluble in an aqueous medium consisting predominantly of aluminum, phosphate, and nitrate components, and recovering from the aqueous medium at least one of the values selected from the group consisting of uranium, phosphorus and aluminum.

4. A process for recovering the mineral values of leached zone material from the Florida pebble phosphate overburden which comprises reacting leached zone material with nitric acid of a concentration between about 35% and about 60% in an amount of between about 60% and about 75% of the amount required to react with all of the constituents of the material capable of reacting with nitric acid while maintaining a temperature between about 60° C. and about 120° C. and a superatmospheric pressure of between about 100 lbs. and about 160 lbs. per square inch gauge for between about 30 and about 10 minutes, separating insoluble material from the reaction products soluble in an aqueous medium consisting predominantly of aluminum, phosphate, and nitrate components, and recovering from the aqueous medium at least one of the values selected from the group consisting of uranium, phosphorus and aluminum.

5. A process for recovering the mineral values of leached zone material from the Florida pebble phosphate overburden which comprises reacting leached zone material with nitric acid of a concentration between about 20% and about 70% in an amount of between about 30% and about 120% of the amount required to react with all of the constituents capable of reacting with nitric acid, separating insoluble material from the aqueous solution consisting predominantly of aluminum, phosphate, and nitrate components, solvent extracting the aqueous solution, and recovering the uranium values from the rich solvent.

6. A process for recovering the mineral values of leached zone material from the Florida pebble phosphate overburden which comprises reacting leached zone material with nitric acid of a concentration between about 20% and about 70% in an amount of between about 30% and about 120% of the amount required to react with all of the constituents capable of reacting with nitric acid, separating insoluble material from the aqueous solution consisting predominantly of aluminum, phosphate, and nitrate components, solvent extracting the aqueous solution with a trialkylphosphoric acid ester, and recovering the uranium values from the rich trialkylphosphoric acid ester.

7. A process for recovering the mineral values of leached zone material from the Florida pebble phosphate overburden which comprises reacting leached zone material with nitric acid of a concentration between about 20% and about 70% in an amount between about 30% and about 120% of the amount required to react with all of the constituents capable of reacting with nitric acid, separating insoluble material from the aqueous solution consisting predominantly of aluminum, phosphate, and nitrate components, solvent extracting the aqueous solution with a trialkylphosphoric acid ester, separating the uranium rich solvent phase from the aqueous raffinate phase, and introducing ammonium ions into the uranium rich solvent phase to precipitate uranium as the $U_3O_8$ oxide.

8. A process for recovering the mineral values of leached zone material from the Florida pebble phosphate overburden which comprises reacting leached zone material with nitric acid of a concentration between about 20% and about 70% in an amount between about 30% and about 120% of the amount required to react with all of the constituents capable of reacting with nitric acid, separating insoluble material from the aqueous solution consisting predominantly of aluminum, phosphate, and nitrate components, solvent extracting the aqueous solution with a trialkylphosphoric acid ester, separating the uranium rich solvent phase from the aqueous raffinate phase, and introducing ammonium ions into the uranium rich solvent phase to precipitate uranium as the $U_3O_8$ oxide, introducing ammonium ions into the aqueous raffinate to precipitate aluminum and iron compounds, and recovering the precipitated materials.

9. A process for recovering the mineral values of leached zone material from the Florida pebble phosphate overburden which comprises reacting leached zone material with nitric acid, mixing the reacted mixture with an aqueous medium selected from the group consisting of water and dilute aqueous solutions of the reaction products of leached zone material with nitric acid, separating the insoluble material from the aqueous solution consisting predominantly of aluminum, phosphate, and nitrate components, solvent extracting the uranium compounds from the aqueous solution, precipitating uranium from the uranium rich solvent, returning the lean solvent to the extraction system, evaporating the aqueous raffinate from the solvent extraction step, calcining the evaporated raffinate at a temperature in excess of 500° C., collecting the oxides of nitrogen evolved in the calcining operation for recycle to the reaction step wherein leached zone material is reacted with nitric acid.

10. A process for water solubilizing the mineral values of leached zone material from the Florida pebble phosphate overburden which comprises reacting dry leached zone material with nitric acid, mixing the reacted mixture with an aqueous medium selected from the group consisting of water and dilute aqueous solutions of the reaction products of leached zone material with nitric acid, separating the insoluble material from the aqueous solution consisting predominantly of aluminum, phosphate, and nitrate components, and removing from the aqueous solution at least one of the values selected from the group consisting of uranium, phosphorus and aluminum.

11. The process for water solubilizing the mineral values of leached zone material from the Florida pebble phosphate overburden which comprises reacting nitric acid and dry mined leached zone material which has been calcined, mixing the reacted mixture with an aqueous medium selected from the group consisting of water and dilute aqueous solutions of the reaction products of leached zone material with nitric acid, separating the insoluble material from the aqueous solution consisting predominantly of aluminum, phosphate, and nitrate components, and recovering from the aqueous solution at least one of the values selected from the group consisting of uranium, phosphorus and aluminum.

12. In a process for solubilizing the mineral values of leached zone material from the Florida pebble phosphate overburden, the steps which comprise reacting leached zone material with nitric acid, mixing the reacted mixture with an aqueous medium selected from the group consisting of water and dilute aqueous solutions of the reaction products of leached zone material with nitric acid, and separating the insoluble material from the aqueous phase, said aqueous phase containing phosphorus, aluminum and uranium values.

13. The process of claim 12 wherein the concentration of said nitric acid is between about 20 and about 70%, and said nitric acid is reacted with leached zone material in an amount between about 30% and about 120% of the amount required to react with all of the constituents in said leached zone material capable of reacting with nitric acid.

14. In a process for solubilizing the mineral values of leached zone material from the Florida pebble phosphate overburden, the steps which comprise reacting leached zone material with nitric acid having a concentration between about 20% and about 70%, said nitric acid being added in an amount between about 30% and about 120% of the amount required to react with all of the constituents in said leached zone material capable of reacting with nitric acid, said reaction being carried out at a temperature between about 60° C. and about 200° C. for between about 0.5 hour and about 6 hours, mixing the reacted mixture with an aqueous medium selected from the group consisting of water and dilute aqueous solutions of the reaction products of leached zone material with nitric acid, and separating the insoluble material from the aqueous phase, said aqueous phase containing phosphorus, aluminum, and uranium values.

(References on following page)

References Cited in the file of this patent

UNITED STATES PATENTS

| | | |
|---|---|---|
| 1,413,720 | Goldschmidt et al. | Apr. 25, 1922 |
| 1,816,285 | Johnson | July 28, 1931 |
| 1,856,187 | Johnson | May 3, 1932 |
| 1,914,404 | Craig | June 20, 1933 |
| 1,976,283 | Johnson | Oct. 9, 1934 |
| 2,227,833 | Hixson et al. | Jan. 7, 1941 |
| 2,485,841 | Pacyna | Oct. 25, 1949 |
| 2,767,045 | McCullough | Oct. 16, 1956 |
| 2,769,686 | McCullough et al. | Nov. 6, 1956 |

OTHER REFERENCES

Warf: U. S. Atomic Energy Commission declassified document No. 2524, declas. Mar. 11, 1949, 10 pages.

Wright: U. S. Atomic Energy Commission paper No. Y-884, May 7, 1952, 20 pages.

Guntz: Comptes Rendus, vol. 234, pp. 868–870 (1952).